(12) United States Patent
Ide et al.

(10) Patent No.: US 6,997,617 B2
(45) Date of Patent: Feb. 14, 2006

(54) ROLLER BEARING

(75) Inventors: Yoshiro Ide, Kanagawa (JP); Masatake Ichimaru, Kanagawa (JP); Yukio Ooura, Kanagawa (JP); Yuko Kamamura, Kanagawa (JP)

(73) Assignee: NSK Ltd., Tokyo (JP)

( * ) Notice: Subject to any disclaimer, the term of this patent is extended or adjusted under 35 U.S.C. 154(b) by 8 days.

(21) Appl. No.: 10/854,262

(22) Filed: May 27, 2004

(65) Prior Publication Data

US 2004/0240764 A1 Dec. 2, 2004

(30) Foreign Application Priority Data

May 28, 2003 (JP) .......................... P.2003-151317

(51) Int. Cl.
*F16C 33/34* (2006.01)
(52) U.S. Cl. ...................... 384/450; 384/564; 384/565; 384/569
(58) Field of Classification Search ................ 384/450, 384/564, 565, 566, 567, 569
See application file for complete search history.

(56) References Cited

U.S. PATENT DOCUMENTS 4,318,574 A    3/1982  Nakamura

FOREIGN PATENT DOCUMENTS

| JP | 51-156346 UM A | 6/1950 |
| JP | 56-17415 UM A | 2/1981 |
| JP | 7-12119 A | 1/1995 |
| JP | 7-12133 A | 1/1995 |
| JP | 10-196660 A | 7/1998 |
| JP | 2002-70874 A | 3/2002 |
| JP | 2003-21145 A | 1/2003 |

*Primary Examiner*—Lenard A. Footland
(74) *Attorney, Agent, or Firm*—Sughrue Mion, PLLC

(57) ABSTRACT

A roller bearing includes an inner ring, an outer ring, a plurality of cylindrical rollers each provided between rolling contact surfaces of the inner ring and the outer ring. Each of the cylindrical rollers includes an end face having a peripheral part that is crowned. A flange portion is formed at an outer circumferential face end part of the inner ring and/or an inner circumferential face end part of the outer ring. The peripheral part is crowned in a curving shape represented by an exponential function of $y = a \cdot \exp(-b \cdot x)$; where a and b are constants, x is a distance from the rolling contact surface in a radial direction of the cylindrical roller, and y is a crowning fall-off amount from a central part of the end face of the cylindrical roller in an axial direction of the cylindrical roller.

4 Claims, 7 Drawing Sheets

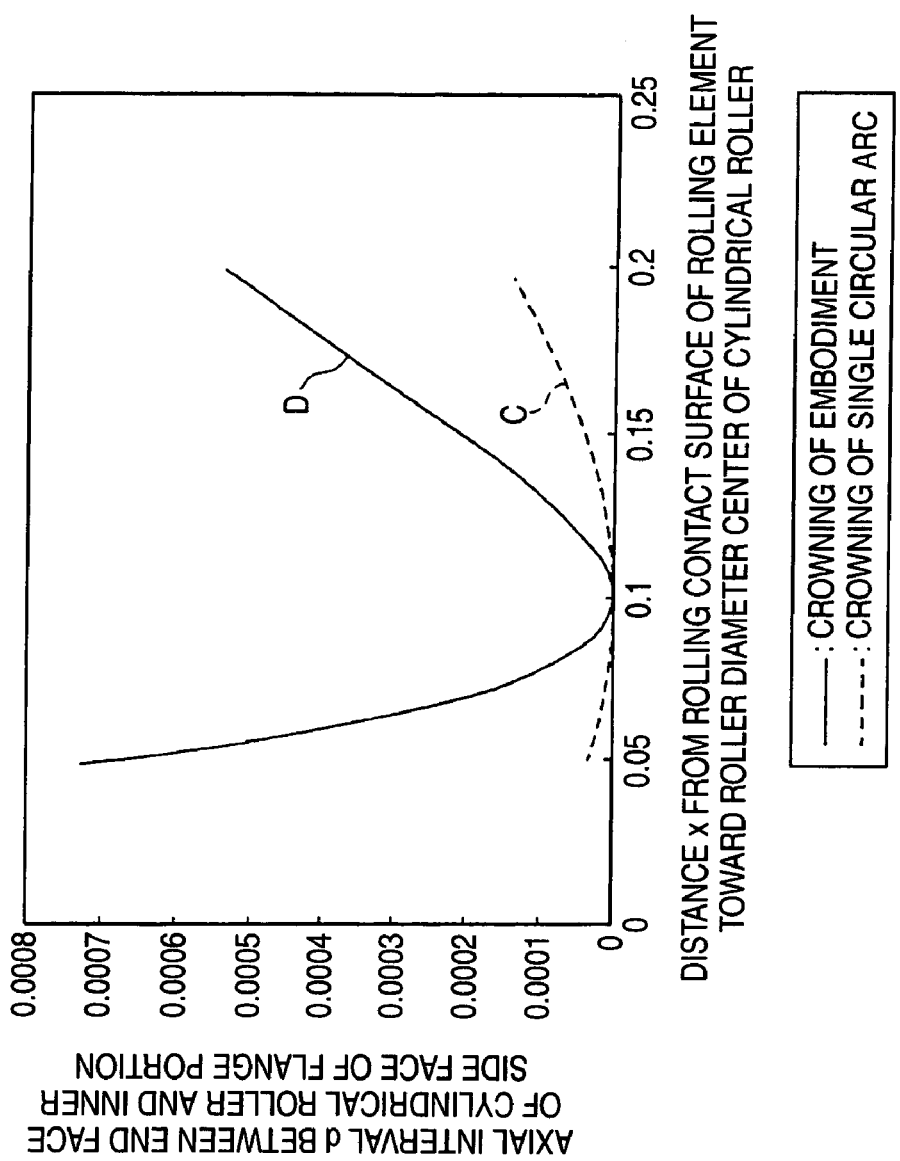

ROLLER BEARING

BACKGROUND OF THE INVENTION

1. Field of the Invention

The present invention relates to improvements in a roller bearing using cylindrical rollers as rolling elements.

2. Background Art

A roller bearing using cylindrical rollers as rolling elements has often a thrust load, as well as a radial load, and has a structure in which a flange portion is provided on an outer circumferential face end part of an inner ring and an inner circumferential face end part of an outer ring, and an end face of a cylindrical roller is contacted with an inner side face of the flange portion to receive the thrust load. However, if the cylindrical roller is rolling while the rolling contact surfaces of rolling elements of the inner ring and the outer ring are skewed, an edge part of the cylindrical roller contacts the inner side face of the flange portion, causing a shorter life of the bearing. For this reason, the inner side face of the flange portion is inclined at a predetermined opening angle to the end face of cylindrical roller in the roller bearing, as described in JP-A-7-12119, for example.

In this roller bearing, when the cylindrical roller is skewed, an edge part of the cylindrical roller is prevented from contacting the inner side face of the flange portion. However, when the cylindrical roller is not skewed, an end face of the cylindrical roller contacts a grinding clearance groove of the inner ring and/or the outer ring, producing an edge load to cause a premature wear, when subjected to a thrust load. Thus, to suppress the occurrence of edge load, the roller bearing has been offered in which a peripheral part of end face of the cylindrical roller is crowned like circular arc at a single curvature (refer to JP-A-2002-70874).

However, if the peripheral part of end face of the cylindrical roller is crowned like circular arc at single curvature, the contact position between cylindrical roller and flange portion is greatly changed with the opening angle of the inner side face of flange portion. Therefore, the roller bearing as described in JP-A-2002-70874 is required to manufacture by setting up the opening angle of the inner side face of flange portion strictly to keep the contact position between cylindrical roller and flange portion invariable, causing the increased cost. Since the roller bearing as described in JP-A-2002-70874 has a narrower clearance formed between the end face of cylindrical roller and the inner side face of flange portion with the contact position between the cylindrical roller and the flange portion therebetween, the lubricant such as grease is difficult to permeate, resulting in a problem that seizure is more likely to occur.

SUMMARY OF THE INVENTION

This invention has been achieved in the light of the above-mentioned problems, and it is an object of the invention to provide a roller bearing that is prevent from an increased cost, seizure or edge load and a premature wear due to skew.

To achieve the object, the invention provides a roller bearing including: an inner ring having a rolling contact surface on an outer circumferential face thereof; an outer ring having a rolling contact surface on an inner circumferential face thereof, the rolling contact surface of the outer ring opposed to the rolling contact surface of the inner ring; a plurality of cylindrical rollers each provided for free rolling between the rolling contact surface of the inner ring and the rolling contact surface of the outer ring, and each including an end faces having a peripheral part which is crowned; and a flange portion formed at an outer circumferential face end part of the inner ring and/or an inner circumferential face end part of the outer ring.

The peripheral part is crowned in a curving shape represented by an exponential function of $$y = a \cdot \exp(-b \cdot x)$$

where a and b are constants, x is a distance from the rolling contact surface in a radial direction of the cylindrical roller, and y is a crowning fall-off amount from a central part of the end face of the cylindrical roller in axial direction of the cylindrical roller.

Preferably, when the end face of the cylindrical roller is pressed against the flange portion without skewing the cylindrical roller, a contact point between the cylindrical roller and the flange portion is located in a crowned portion of the cylindrical roller.

Preferably, the contact point of the flange portion contact with the end face of the cylindrical roller is located except at an end of the flange portion.

Preferably, when the cylindrical roller is skewed up to contacting the flange portion, the contact point between the end face of the cylindrical roller and the flange portion is located on the crowned portion for the cylindrical roller, and except at the end of the flange portion for flange portion.

BRIEF DESCRIPTION OF THE DRAWINGS

The present invention may be more readily described with reference to the accompanying drawings:

FIG. 7 is a graphical representation showing the relationship between the axial interval d as shown in FIG. 6 and the distance x as shown in FIG. 4.

DETAILED DESCRIPTION OF THE PREFERRED EMBODIMENTS

Referring to FIGS. 1 to 10, the preferred embodiments of the present invention will be described below.

Figure 1:
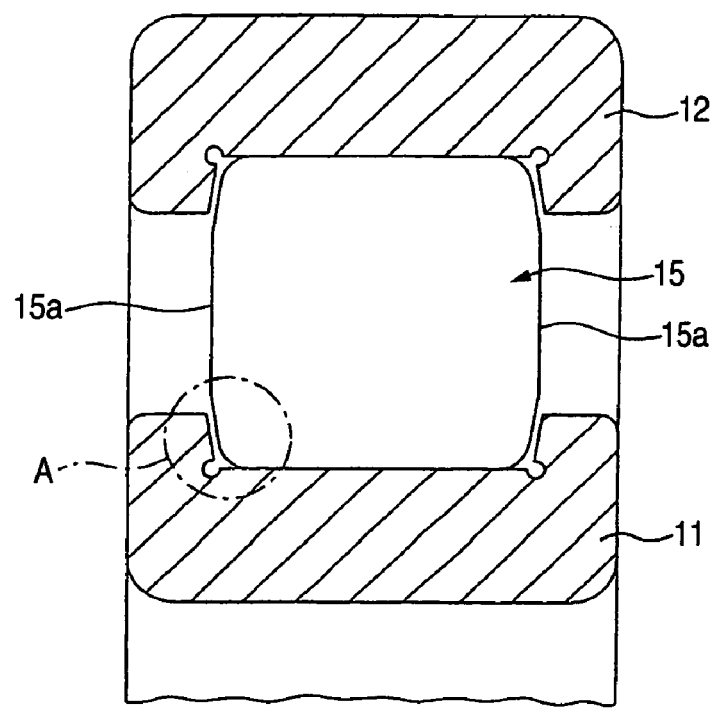
FIG. 1 is an axial cross-sectional view of a roller bearing according to one embodiment of the present invention.

FIG. 1 is an axial cross-sectional view of a roller bearing according to one embodiment of the invention. The roller bearing according to this embodiment of the invention comprises an inner ring 11 and an outer ring 12, as shown in FIG. 1.

Figure 2:
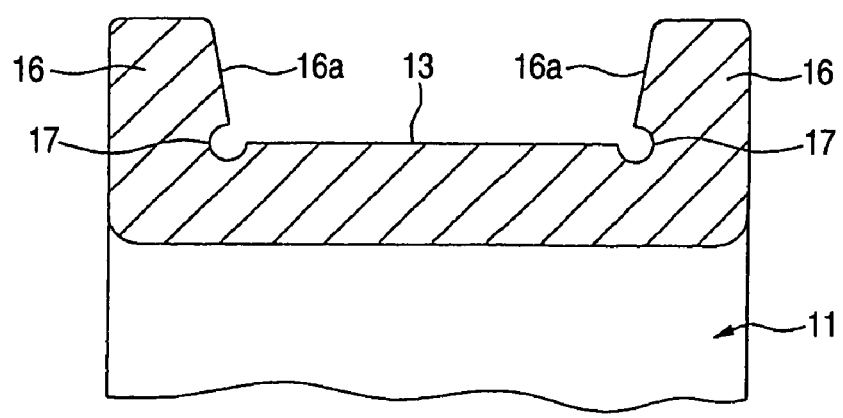
FIG. 2 is an axial cross-sectional view of an inner ring as shown in FIG. 1.
Figure 3:
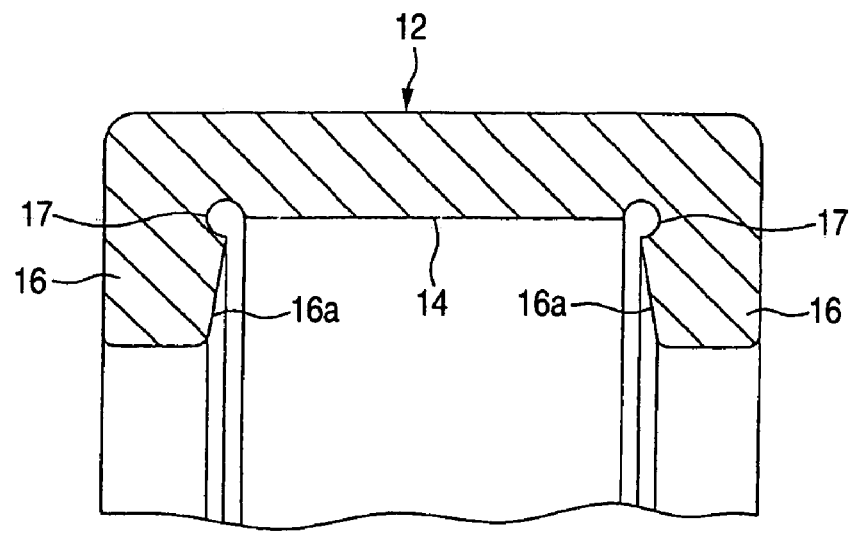
FIG. 3 is an axial cross-sectional view of an outer ring as shown in FIG. 1.

The outside diameter of the inner ring 11 is smaller than the inside diameter of the outer ring 12. The inner ring 11 is formed like an annulus ring. A rolling contact surface 13 of rolling element is formed on an outer circumferential face of the inner ring 11, as shown in FIG. 2. On the other hand, the inside diameter of the outer ring 12 is larger than the outside diameter of the inner ring 11. The outer ring 12 is formed like an annulus ring. A rolling contact surface 14 of rolling element is formed on an inner circumferential face of the outer ring 12, as shown in FIG. 3. These rolling contact surfaces 13 and 14 of rolling elements are opposed to each other. A plurality of cylindrical rollers 15 as rolling elements are provided for free rolling between the rolling contact surface 13 of rolling element on the inner ring and the rolling contact surface 14 of rolling element on the outer ring.

Each cylindrical roller 15 has two end faces 15$a$ opposed to the inner side faces 16$a$ of the flange portions 16 (see FIGS. 2 and 3), which are formed at both end parts of the outer circumferential face of the inner ring 11 and both end parts of the inner circumferential face of the outer ring 12. The inner side face 16$a$ of the flange portion 16 is an inclined surface inclined at a predetermined opening angle to the end face 15$a$ of the cylindrical roller 15. In FIGS. 2 and 3, reference numeral 17 is a grinding clearance groove formed at the base end part of the inner side face 16$a$ of the flange portion.

Figure 4:
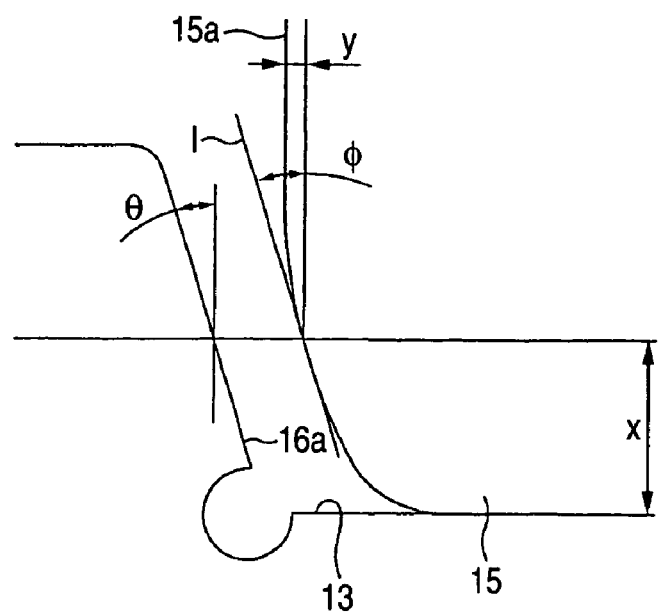
FIG. 4 is a detailed view of A portion as shown in FIG. 1.

FIG. 4 is a detailed view of A portion as shown in FIG. 1. Assuming that the distance from the rolling contact surface 13 (or 14) of rolling element in a direction to the roller diameter center of the cylindrical roller 15 is x (variable), and the crowning fall-off amount from the central part of the end face of the cylindrical roller 15 at this position is y, as shown in FIG. 4, the peripheral part of the end face of the cylindrical roller 15 is crowned in a curving shape represented by an exponential function of $$y = a \cdot \exp(-b \cdot x) \tag{1}$$

where a and b are constants. In FIG. 4, θ denotes an opening angle of the inner side face 16$a$ of the flange portion, l denotes a tangential line of a crowning curve, and φ denotes a gradient of the tangential line l at a contact position between the cylindrical roller 15$a$ and the flange portion 16. Also, x, y and d are dimensionless quantities of the actual values divided by the roller diameter in this specification.

Figure 5:
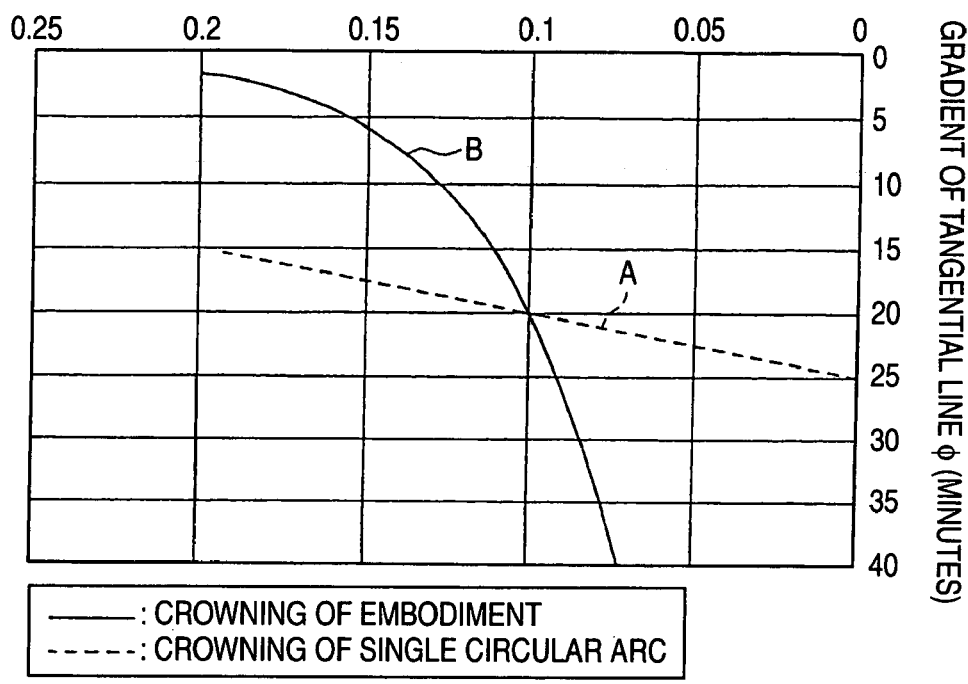
FIG. 5 is a graphical representation showing the relationship between the gradient of tangential line as shown in FIG. 4 and the distance x from the rolling contact surface of rolling element in a direction to the center of roller diameter.

FIG. 5 shows the relationship between the gradient φ of tangential line l and the distance x. In FIG. 5, the relationship between the gradient φ and the distance x when the peripheral part of end face of the cylindrical roller 15 is crowned at a single curvature is indicated by the broken line A. Also, the relationship between the gradient φ and the distance x when the peripheral part of end face of the cylindrical roller 15 is crowned in the curving shape as represented by expression (1) is indicated by the solid line B (a=0.0028, b=25). As will be apparent from FIG. 5, the distance x from the rolling contact surface or rolling element is less changed even if the gradient φ of tangential line l is greatly changed when the peripheral part of end face of the cylindrical roller 15 is crowned in the curving shape as represented by expression (1) than when the peripheral part of end face of the cylindrical roller 15 is crowned at single curvature. Thereby, even if the opening angle θ of the flange portion 16 has a dispersion for each product, the contact position between the cylindrical roller 15 and the flange portion 16 remains around the predetermined position, so that a permissible range of the opening angle θ is greater than conventionally kept, and the occurrence of edge load is prevented without increasing the cost.

Figure 6:
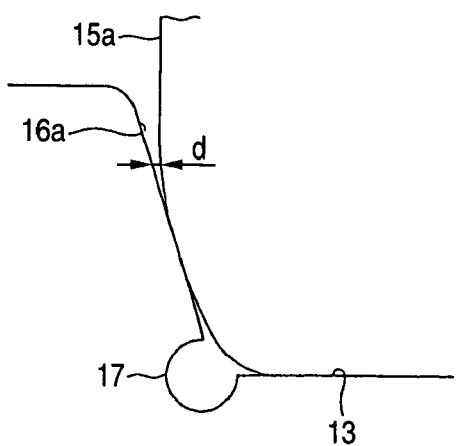
FIG. 6 is a view showing a state where a cylindrical roller contacts a flange portion.

FIG. 6 is a view showing a state where an end face of the cylindrical roller contacts an inner side face of the flange portion without skewing. In FIG. 6, d denotes an axial interval between the end face 15$a$ of cylindrical roller and the inner side face 16$a$ of flange portion when the end face 15$a$ of cylindrical roller contacts an inner side face 16$a$ of flange portion.

FIG. 7 shows the relationship between the axial interval d and the distance x from the rolling contact surface of rolling element. In FIG. 7, the relationship between the axial interval d and the distance x when the peripheral part of end face of the cylindrical roller 15 is crowned at a single curvature is indicated by the broken line C. Also, the relationship between the axial interval d and the distance x when the peripheral part of end face of the cylindrical roller 15 is crowned in the curving shape as represented by expression (1) is indicated by the solid line D (a=0.0028, b=25). As will be apparent from FIG. 7, the axial interval d between the end face 15$a$ of cylindrical roller and the inner side face 16$a$ of the flange portion is more greatly changed with a change in the distance x when the peripheral part of end face of the cylindrical roller 15 is crowned in the curving shape as represented by expression (1) as compared with when the peripheral part of end face of the cylindrical roller 15 is crowned at a single curvature. That is, the axial interval d is sharply expanded slightly out of the position contact with the flange portion. In this way, the clearance (axial interval d) formed between the end face 15$a$ of cylindrical roller and the inner side face 16$a$ of flange portion is secured larger than conventionally, whereby a lubricant such as grease is likely to permeate between the end face 15$a$ of cylindrical roller and the inner side face 16$a$ of flange portion, preventing the occurrence of seizure and edge load.

Figure 8A:
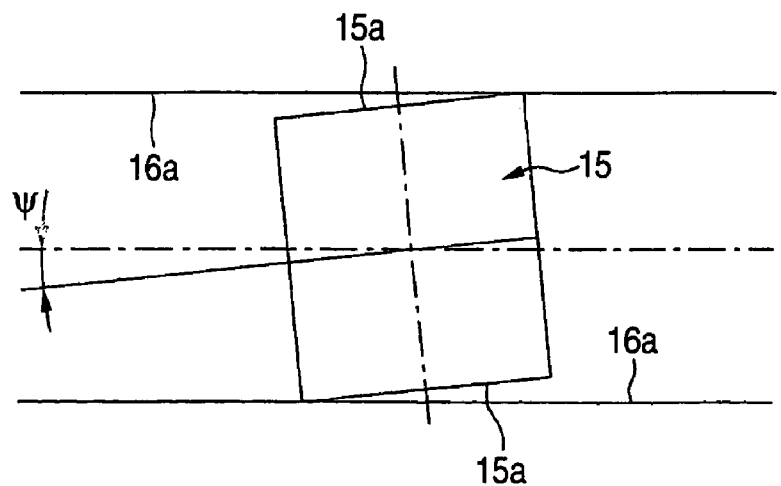
FIGS. 8A and 8B are views showing a state where the cylindrical roller is skewed.
Figure 8B:
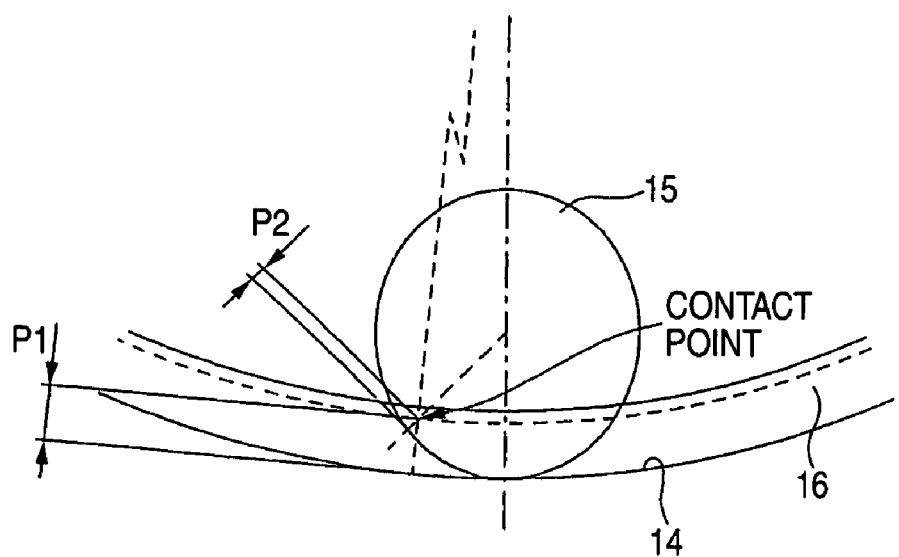
Figure 9A:
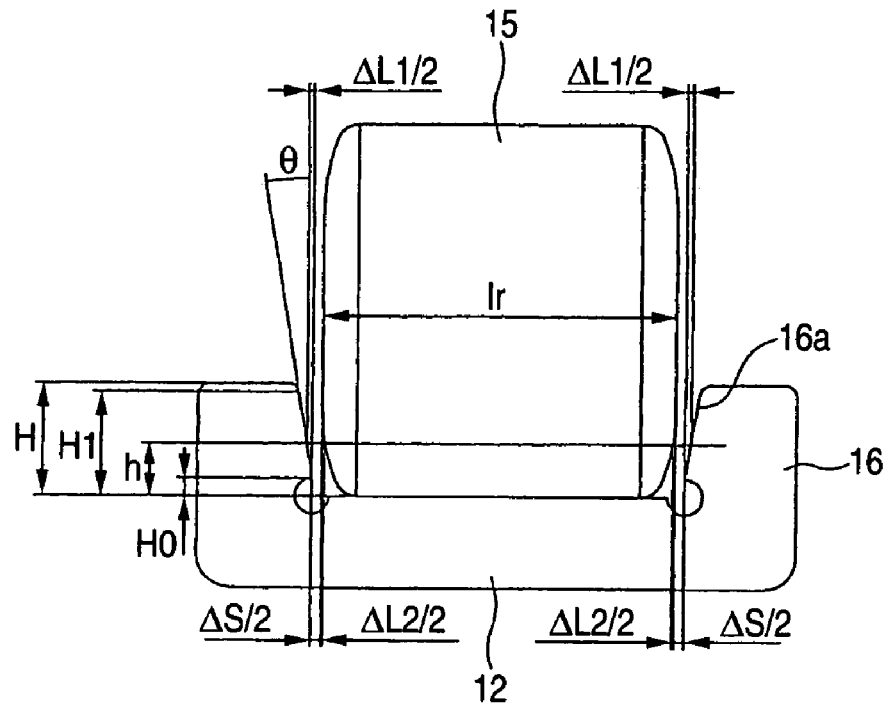
FIGS. 9A and 9B are views showing the dimensional relationship between the cylindrical roller and the flange portion.
Figure 9B:
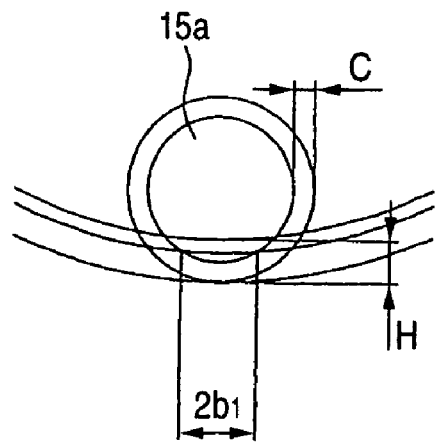

FIGS. 8A and 8B are views showing a state where the cylindrical roller 15 is skewed. In FIG. 8B, P1 denotes a first contact point distance from the rolling contact surface 14 of outer ring to the contact point between the cylindrical roller 15 and the flange portion 16, and P2 denotes a second contact point distance from the outer circumferential face of cylindrical roller to the contact point between the cylindrical roller 15 and the flange portion 16. Also, in FIG. 8A, Ψ denotes a maximum skew angle of the cylindrical roller 15 that can occur geometrically. Assuming that $l_r$ is the axial length of the cylindrical roller 15, 2b1 is the distance between two points at which the end face 15$a$ of the cylindrical roller 15 contacts the inner side face 16$a$ of the flange portion 16, his the contact height from the contact position between the cylindrical roller 15 and the flange portion 16 to the rolling contact surface of rolling element, ΔL1 denotes the sum of axial intervals from the inner side face of flange portion to the base end part of flange portion at the contact height h, ΔL2 denotes the sum of crowning fall-off amounts on the end face of cylindrical roller at the contact height h, and ΔS denotes the sum of axial intervals from the base end part of flange portion to the end face of cylindrical roller as shown in FIG. 9, this skew angle Ψ is represented by the following expression.

$$\Psi = \sin^{-1}\left[\frac{2b_1 l_r(1+\zeta) - \{(2b_1 l_r)^2(1+\zeta)^2 - 8\zeta l_r^2(l_r^2 + b_1^2)\}^{1/2}}{2(l_r^2 + b_1^2)}\right] \quad (2)$$

where $$\zeta = (\Delta L1 + \Delta L2)/l_r + \Delta s \quad (<<1) \quad (3)$$

$$\Delta s = \Delta S/l_r \quad (4)$$

In FIG. 9, H0 denotes the height of a grinding clearance groove 17 at the base end of flange portion, and H1 denotes the height H of the flange portion 16 subtracted by a chamfer amount at the upper end of the flange portion.

Figure 10:
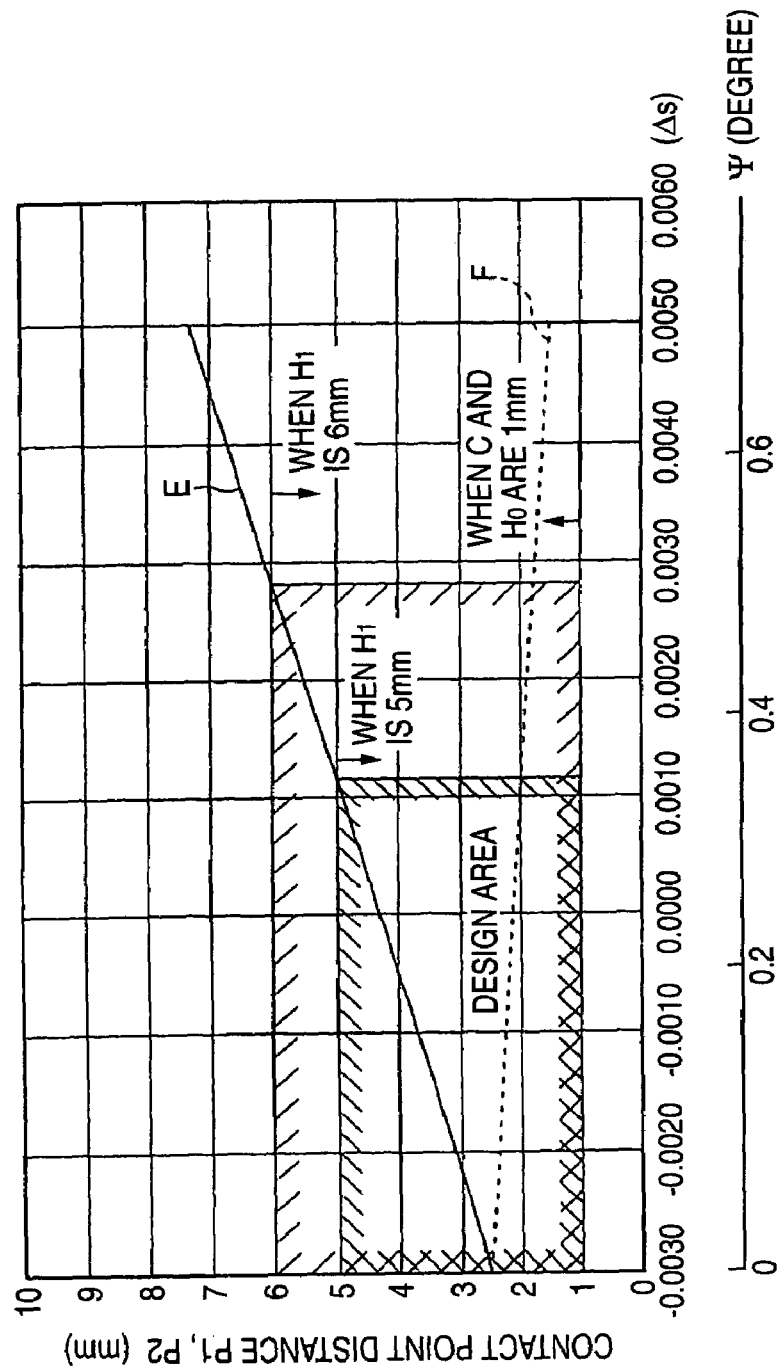
FIG. 10 is a graphical representation showing the relationship between contact point distances P1, P2 and skew angle as shown in FIG. 9A.

FIG. 10 shows the relationship between contact point distances P1, P2 and skew angle $\Psi$ and $\Delta s$. In FIG. 10, the relationship between the contact point distance P1 and the skew angle $\Psi$ and $\Delta s$ is indicated by the solid line E, supposing that the diameter of the cylindrical roller 15 is 24 mm, the axial length $l_r$ of the cylindrical roller 15 is 26 mm, the chamfer amount C of the cylindrical roller 15 is 1 mm, the raceway diameter of outer ring is 180.5 mm, and the opening angle $\theta$ is 20 minutes. Also, the relationship between the contact point distance P2 and the skew angle $\Psi$ and $\Delta s$ is indicated by the broken line F, supposing that the diameter of the cylindrical roller 15 is 24 mm, the axial length $l_r$ of the cylindrical roller 15 is 26 mm, the chamfer amount C of the cylindrical roller 15 is 1 mm, the raceway diameter of outer ring is 180.5 mm, and the opening angle $\theta$ is 20 minutes. As will be apparent from FIG. 10, when H1 is 6 mm and H0 is 1 mm, the range of $\Delta s$ is made a design range as shown in FIG. 10. Thereby, the contact position between the cylindrical roller 15 and the flange portion 16 is placed within the inner side face of the flange portion 16, when the cylindrical roller 15 is skewed, preventing premature wear due to the skew.

H1 is 6 mm in the above embodiments. Similarly, the range of $\Delta s$ is made a design range as shown in FIG. 10 when H1 is 5 mm. Even when the cylindrical roller 15 is skewed, the contact position between the cylindrical roller 15 and the flange portion 16 is placed within the inner side face of the flange portion 16.

The contact point distance P1 on the flange plane is increased to approach an upper end of the flange portion 16, as $\Delta s$ is greater. On the other hand, the contact point distance P2 on the end face of roller is decreased to approach a rolling contact surface of roller, as $\Delta s$ is greater. The design area is the area where P1 does not exceed H1, and P2 is not smaller than the chamfer amount C of roller or H0. In the above embodiments, $\Delta s$ in which the line E is restricted to H1 is the upper limit of $\Delta s$ in the design area.

Considering the arbitrary constants a and b of the exponential function in the above embodiments of this invention, though the gradients of the solid line and the broken line are changed in FIG. 10, the design area is appropriately selected in the same way, so that the contact position is placed within the inner side face of the flange portion even when the cylindrical roller is skewed.

As described above, with the roller bearing according to the invention, the peripheral part of end face of the cylindrical roller is crowned in the curving shape represented by expression (1). Hence, the roller bearing is prevented from an increased cost, seizure or edge load and a premature wear due to skew.

What is claimed is:

1. A roller bearing comprising:
   an inner ring having a rolling contact surface on an outer circumferential face thereof;
   an outer ring having a rolling contact surface on an inner circumferential face thereof, the rolling contact surface of the outer ring opposed to the rolling contact surface of the inner ring;
   a plurality of cylindrical rollers each provided for free rolling between the rolling contact surface of the inner ring and the rolling contact surface of the outer ring, and each including an end face having a peripheral part that is crowned; and
   a flange portion formed at an outer circumferential face end part of the inner ring and/or an inner circumferential face end part of the outer ring;
   wherein the peripheral part is crowned in a curving shape represented by an exponential function of $y = a \cdot \exp(-b \cdot x)$ where a and b are constants, x is a distance from the rolling contact surface in a radial direction of the cylindrical roller, and y is a crowning fall-off amount from a central part of the end face of the cylindrical roller in an axial direction of the cylindrical roller.

2. The roller bearing according to claim 1,
   wherein, when the end face of the cylindrical roller is pressed against the flange portion without skewing the cylindrical roller, a contact point between the cylindrical roller and the flange portion is located in a crowned portion of the cylindrical roller.

3. The roller bearing according to claim 2,
   wherein the contact point of the flange portion contact with the end face of the cylindrical roller is located except at an end of the flange portion.

4. The roller bearing according to claim 3,
   wherein, when the cylindrical roller is skewed up to contacting the flange portion, the contact point between the end face of the cylindrical roller and the flange portion is located on the crowned portion for the cylindrical roller, and except at the end of the flange portion for flange portion.

* * * * *